(12) United States Patent
Pratt et al.

(10) Patent No.: US 10,830,086 B2
(45) Date of Patent: Nov. 10, 2020

(54) CAM ISOLATION SYSTEM FOR GAS TURBINE ENGINE COMPRESSOR SECTION

(71) Applicant: United Technologies Corporation, Farmington, CT (US)

(72) Inventors: William S. Pratt, West Hartford, CT (US); Paul W. Duesler, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/038,344

(22) Filed: Jul. 18, 2018

(65) Prior Publication Data

US 2020/0025023 A1 Jan. 23, 2020

(51) Int. Cl.
*F01D 17/16* (2006.01)
*F01D 25/28* (2006.01)

(52) U.S. Cl.
CPC .......... *F01D 17/162* (2013.01); *F01D 25/28* (2013.01); *F05D 2220/32* (2013.01)

(58) Field of Classification Search
None
See application file for complete search history.

(56) References Cited

U.S. PATENT DOCUMENTS

| 3,873,230 | A | 3/1975 | Norris et al. |
| 4,720,237 | A | 1/1988 | Weiner et al. |
| 4,834,613 | A | 5/1989 | Hansen et al. |
| 8,177,490 | B2* | 5/2012 | Bouru ............... F01D 17/162 |
| | | | 415/150 |
| 9,091,209 | B2* | 7/2015 | LeBlanc .............. F02C 9/18 |
| 2011/0033297 | A1 | 2/2011 | Bouru |
| 2014/0050580 | A1 | 2/2014 | Hagen et al. |
| 2014/0133968 | A1 | 5/2014 | Holchin et al. |
| 2018/0223868 | A1* | 8/2018 | Vallino ............... F01D 17/162 |

FOREIGN PATENT DOCUMENTS

| EP | 1387041 B1 | 2/2004 |
| GB | 1105926 | 3/1968 |

OTHER PUBLICATIONS

European Search Report for Application No. EP 19 17 5251; dated Dec. 4, 2019.

\* cited by examiner

*Primary Examiner* — Igor Kershteyn
*Assistant Examiner* — Juan G Flores
(74) *Attorney, Agent, or Firm* — Cantor Colburn LLP

(57) ABSTRACT

A cam isolation system for a gas turbine engine compressor actuator includes a torque tube. The system also includes a cam bracket operatively coupled to an engine case structure, the cam bracket defining a slot. The system further includes an actuator bracket operatively coupled to the torque tube at a first end of the actuator bracket, the actuator bracket having a pin disposed within the slot of the cam bracket.

13 Claims, 2 Drawing Sheets

CAM ISOLATION SYSTEM FOR GAS TURBINE ENGINE COMPRESSOR SECTION

STATEMENT OF FEDERAL SUPPORT

This invention was made with Government support awarded by the United States. The Government has certain rights in the invention.

BACKGROUND

Exemplary embodiments pertain to the art of gas turbine engines and, more particularly, to a cam isolation system of a compressor section for such gas turbine engines.

The advent of on leading edge (OLE) airfoils to axial compressor gas turbine engine technology has enhancements related to compressor efficiency, leading to increased thrust and fuel efficiency. However, OLE airfoils also drastically increase the surge loading experienced by the actuation system responsible for turning the airfoils. This is due to the center of pressure on the airfoil being farther away from a trunnion, or rotating axis of the airfoil. While the linkage system capability is being pushed to its limits, resolving the load out where the actuator is attached to the engine outer case may exceed material capability. Driven by lower temperatures and large volume, the outer split cases of jet engines are now being driven to composite materials that are not as strong as conventional titanium. Combined with the higher surge loads, this threatens pushing the engine outer case back to titanium, which would lead to an undesirable massive weight gain.

BRIEF DESCRIPTION

Disclosed is a cam isolation system for a gas turbine engine compressor actuator. The system includes a torque tube. The system also includes a cam bracket operatively coupled to an engine case structure, the cam bracket defining a slot. The system further includes an actuator bracket operatively coupled to the torque tube at a first end of the actuator bracket, the actuator bracket having a pin disposed within the slot of the cam bracket.

In addition to one or more of the features described above, or as an alternative, further embodiments may include that the engine case structure is formed of a composite material.

In addition to one or more of the features described above, or as an alternative, further embodiments may include that the cam bracket includes a first cam bracket side and a second cam bracket side, the first cam bracket side defining a first slot and the second cam bracket side defining a second slot, the actuator bracket having a first pin extending from a first side of the actuator bracket and into the first slot, the actuator bracket having a second pin extending from a second side of the actuator bracket and into the second slot.

In addition to one or more of the features described above, or as an alternative, further embodiments may include that the first pin and the second pin are integrally formed with the actuator bracket.

In addition to one or more of the features described above, or as an alternative, further embodiments may include that the actuator bracket is not directly coupled to the engine case structure.

In addition to one or more of the features described above, or as an alternative, further embodiments may include that the pin is disposed within the slot for movement within the slot during a surge event of the gas turbine engine compressor section.

In addition to one or more of the features described above, or as an alternative, further embodiments may include that disposal of the pin within the slot prevents radial and tangential vibration of the actuator bracket.

In addition to one or more of the features described above, or as an alternative, further embodiments may include that the cam bracket is bolted to the engine case structure.

Also disclosed is a gas turbine engine including a compressor section, a combustor section, and a turbine section. The gas turbine engine also includes a variable vane actuator assembly for the compressor section. The variable vane actuator assembly includes a torque tube operatively coupled to a variable vane mechanism. The variable vane actuator assembly also includes a cam bracket operatively coupled to an engine case structure. The variable vane actuator assembly further includes an actuator bracket operatively coupled to the torque tube at a first end of the actuator bracket, the actuator bracket operatively coupled to the cam bracket at a second end of the actuator bracket, the actuator bracket not directly coupled to engine case structure.

In addition to one or more of the features described above, or as an alternative, further embodiments may include that the engine case structure is formed of a composite material.

In addition to one or more of the features described above, or as an alternative, further embodiments may include that the cam bracket includes a first cam bracket side and a second cam bracket side, the first cam bracket side defining a first slot and the second cam bracket side defining a second slot, the actuator bracket having a first pin extending from a first side of the actuator bracket and into the first slot, the actuator bracket having a second pin extending from a second side of the actuator bracket and into the second slot.

In addition to one or more of the features described above, or as an alternative, further embodiments may include that the first pin and the second pin are integrally formed with the actuator bracket.

In addition to one or more of the features described above, or as an alternative, further embodiments may include that the pins are disposed in the slots for movement within the slots during a surge event of the compressor section.

In addition to one or more of the features described above, or as an alternative, further embodiments may include that disposal of the pins within the slots prevents radial and tangential vibration of the actuator bracket.

In addition to one or more of the features described above, or as an alternative, further embodiments may include that the cam bracket is bolted to the engine case structure.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
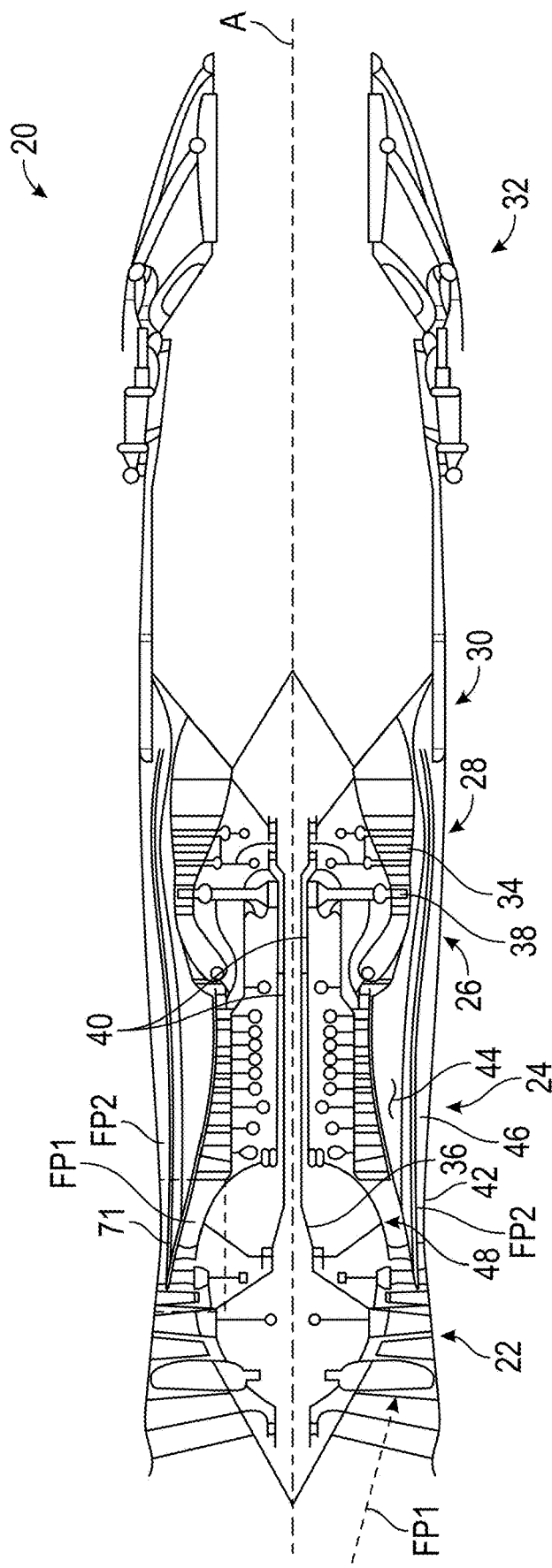
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmenter section 30 and a nozzle section 32. The sections are defined along a central longitudinal engine axis A. Although depicted as an augmented low bypass gas turbine engine in the disclosed non-limiting embodiment, it should be understood that the concepts described herein are applicable to other gas turbine engines including geared architecture engines, direct drive turbofans, turboshaft engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine may define the outer engine case structure 42 and the inner engine structure 44 which essentially define an exoskeleton to support the core engine therein.

Air which enters the fan section 22 is divided between a core flow through the core flow path 48 and a secondary flow through the secondary flow path 46. The core flow passes through the combustor section 26, the turbine section 28, then the augmenter section 30 where fuel may be selectively injected and burned to generate additional thrust through the nozzle section 32. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 42 and the inner engine structure 44 then may be at least partially injected into the core flow adjacent the nozzle section 32.

A radial flow separation wall 71 is configured to separate a first flow path FP1 of the gas turbine engine 20 from a second flow path FP2 of the gas turbine engine 20. The first flow path FP1 flows through blades of the gas turbine engine 20 and the second flow path FP2 flows through guide vanes, also referred to as stators, of the gas turbine engine 20. The first flow path FP1 may be the core flow path 48 and the second flow path FP2 may be the secondary flow path. It is understood that embodiments disclosed herein are also applicable to gas turbine engines with more than two flow paths. The radial flow separation wall 71 may be composed of one or more components of the gas turbine engine 20.

Figure 2:
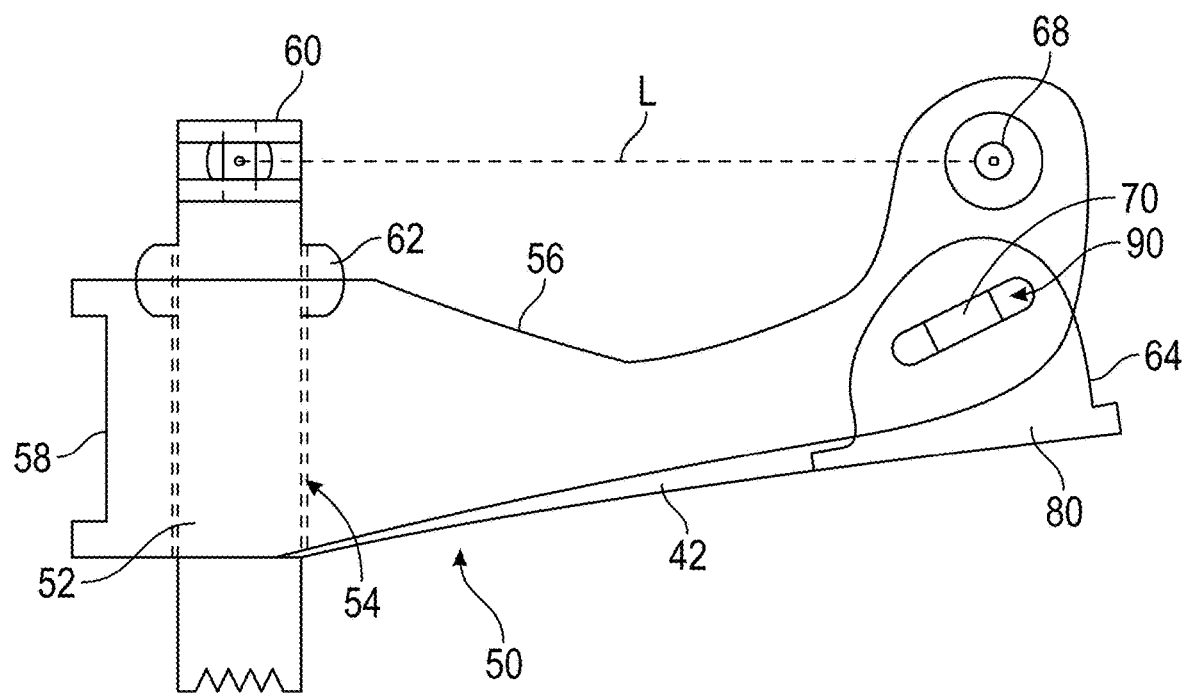
FIG. 2 is a side elevational view of a cam isolation system for a compressor section of the gas turbine engine.
Figure 3:
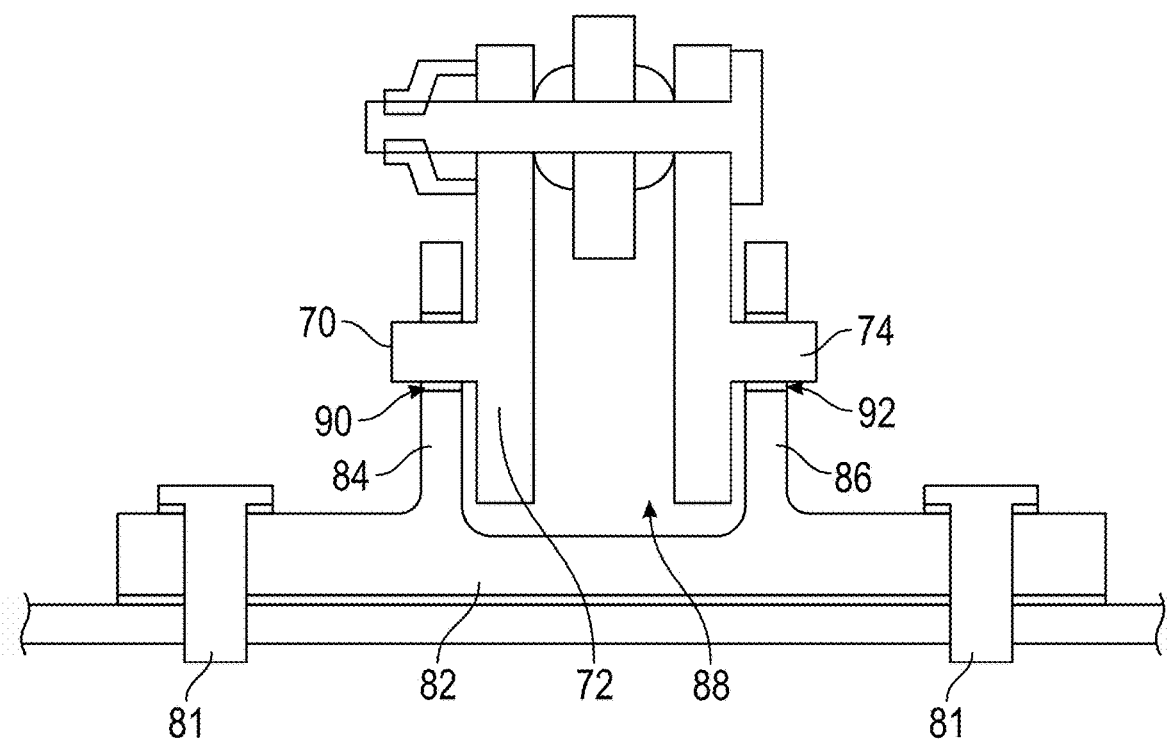
FIG. 3 is an end view of the cam isolation system.

Referring now to FIGS. 2 and 3, a variable vane actuator assembly 50 for the compressor section 24 is illustrated. The variable vane actuator assembly 50 may also be referred to as a cam isolation system, as the variable vane actuator assembly 50 dissociates surge loads experienced by the compressor section 50 from the outer engine case structure 42, as will be appreciated from the disclosure herein. The outer engine case structure 42 is a composite material. By dissociating the compressor surge loads from the outer engine case structure 42, the structure 42 may remain composite and provide the beneficial weight savings associated with the composite, when compared to other materials, such as titanium.

The variable vane actuator assembly 50 includes a torque tube 52 that is operatively coupled to a variable vane mechanism (not shown) that transfers forces to one or more variable vanes to impart movement of the vane(s). The torque tube 52 is disposed within an aperture 54 of an actuator bracket 56. The aperture 54 of the actuator bracket 56 is located proximate a first end 58 of the actuator bracket 56. The torque tube 52 includes an outer end 60 that extends through, and out of, the aperture 54 of the actuator bracket 56. A mount spherical 62 provides an interface between the torque tube 52 and the actuator bracket 56. The actuator bracket 56 includes a second end 64 that provides an actuator mounting location 68 for coupling of an actuator (not shown) thereto. The actuator extends between the actuator mounting location 68 and the torque tube 52 for transfer of a load to the torque tube 52 along a load path L. The load on the torque tube 52 actuates movement of the variable vane(s).

The actuator bracket 56 includes a first pin 70 extending outwardly in a first direction from a main body portion 72 of the actuator bracket 56 and a second pin 74 extending outwardly from the main body portion 72 in a second direction that is opposite to that of the first direction. In some embodiments, the first pin 70 and the second pin 74 are integrally formed with the actuator bracket 56.

The variable vane actuator assembly 50 also includes a cam bracket 80 that is operatively coupled to the outer engine case structure 42. In some embodiments, the cam bracket 80 is directly coupled to the outer engine case structure 42 with mechanical fasteners, such as bolts 81 or the like. The cam bracket 80 includes a cam base 82 that is the portion of the cam bracket 80 that is coupled to the outer engine case structure 42. Extending outwardly from the cam base is a first cam bracket side 84 and a second cam bracket side 86. The first and second cam bracket sides 84, 86 are spaced from each other to define a cam bracket space 88. The first cam bracket side 84 defines a first slot 90 and the second cam bracket side 86 defines a second slot 92.

A portion of the actuator bracket 56 that is proximate the second end 64 of the actuator bracket 56 is disposed within the cam bracket space 88. The first pin 70 of the actuator bracket 56 is disposed within the first slot 90 and the second pin 74 of the actuator bracket 56 is disposed within the second slot 92.

Rather than having the actuator bracket 56 rigidly fixed to the outer engine case structure 42—whether with direct coupling or inflexible indirect coupling—the actuator bracket 56 disclosed herein is decoupled from the outer engine case structure 42 in a manner that allows relative movement between the actuator bracket 56 and the outer engine case structure 42. This is due to the cam bracket slots 90, 92 that accommodate translation of the pins 70, 74 of the actuator bracket 56 therein. This is particularly beneficial during surge load events experienced by the compressor section 24. In such events, the surge loads are not transferred to the outer engine case structure 42. This is important for outer engine case structures that are formed of composite.

Coupling of the actuator bracket 56 to the cam bracket 80 in the above-described manner also prevents the actuator bracket 56 from experiencing engine radial and tangential vibratory modes that may otherwise cause the bracket to fail in high-cycle fatigue, and also to provide the necessary constraints to ensure accuracy between the actuator stroke and effector output. The actuator bracket coupling locations now put less parts in loading and will lead to more predictable deflection and engine behavior. Without the embodiments described herein, a significantly stronger, and heavier, material (e.g., titanium) would have to be utilized for the outer engine case structure 42.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cam isolation system for a gas turbine engine compressor actuator, comprising:
   a torque tube;
   a cam bracket operatively coupled to an engine case structure, the cam bracket having a first cam bracket side and a second cam bracket side, the first cam bracket side defining a first slot and the second cam bracket side defining a second slot; and
   an actuator bracket operatively coupled to the torque tube at a first end of the actuator bracket, the actuator bracket having a first pin extending from a first side of the actuator bracket and into the first slot and a second pin extending from a second side of the actuator bracket and into the second slot.

2. The cam isolation system of claim 1, wherein the engine case structure is formed of a composite material.

3. The cam isolation system of claim 1, wherein the first pin and the second pin are integrally formed with the actuator bracket.

4. The cam isolation system of claim 1, wherein the actuator bracket is not directly coupled to the engine case structure.

5. The cam isolation system of claim 1, wherein the first pin and the second pin are disposed within the first slot and the second slot for movement within the first slot and the second slot during a surge event of a compressor section of the gas turbine engine.

6. The cam isolation system of claim 1, wherein disposal of the first pin within the first slot and the second pin in the second slot prevents radial and tangential vibration of the actuator bracket.

7. The cam isolation system of claim 1, wherein the cam bracket is bolted to the engine case structure.

8. A gas turbine engine comprising:
   a compressor section;
   a combustor section;
   a turbine section; and
   a variable vane actuator assembly for the compressor section, the variable vane actuator assembly comprising:
      a torque tube operatively coupled to a variable vane mechanism;
      a cam bracket operatively coupled to an engine case structure, the cam bracket including a first cam bracket side and a second cam bracket side, the first cam bracket side defining a first slot and the second cam bracket side defining a second slot; and
      an actuator bracket operatively coupled to the torque tube at a first end of the actuator bracket, the actuator bracket operatively coupled to the cam bracket at a second end of the actuator bracket, the actuator bracket not directly coupled to the engine case structure, the actuator bracket having a first pin extending from a first side of the actuator bracket and into the first slot and a second pin extending from a second side of the actuator bracket and into the second slot.

9. The gas turbine engine of claim 8, wherein the engine case structure is formed of a composite material.

10. The gas turbine engine of claim 8, wherein the first pin and the second pin are integrally formed with the actuator bracket.

11. The gas turbine engine of claim 8, wherein the first pin and the second pin are disposed in the first slot and the second slot for movement within the first slot and the second slot during a surge event of the compressor section.

12. The gas turbine engine of claim 8, wherein disposal of the first pin within the first slot and the second pin in the second slot prevents radial and tangential vibration of the actuator bracket.

13. The gas turbine engine of claim 8, wherein the cam bracket is bolted to the engine case structure.

* * * * *